United States Patent [19]

Baltus et al.

[11] Patent Number: 5,760,128
[45] Date of Patent: Jun. 2, 1998

[54] PROCESS FOR THE PRODUCTION OF A MULTI-LAYER FINISH AND A WATER-BORNE COATING

[75] Inventors: Wolfgang Baltus; Jan Berg, both of Münster; Arnold Dobbelstein, deceased, late of Münster, all of Germany, by Hildegard Dobbelstein, Chrisiane Dobbelstein, legal representatives

[73] Assignees: BASF Lacke; Farben, AG, both of Muenster-Hiltrup, Germany

[21] Appl. No.: 956,871

[22] PCT Filed: Feb. 27, 1991

[86] PCT No.: PCT/EP91/00358

§ 371 Date: Dec. 27, 1993

§ 102(e) Date: Dec. 27, 1993

[87] PCT Pub. No.: WO91/13923

PCT Pub. Date: Sep. 19, 1991

[30] Foreign Application Priority Data

Mar. 5, 1990 [DE] Germany ................ 40 06 832.3

[51] Int. Cl.[6] .................................................. C08K 3/20
[52] U.S. Cl. ................ 524/591; 427/407.1; 427/409; 427/388.4; 524/839; 524/840; 528/44; 528/45; 528/80; 528/84
[58] Field of Search ........................ 524/591, 839, 524/840; 427/407.1, 409, 388.4; 528/44, 45, 80, 84

[56] References Cited

U.S. PATENT DOCUMENTS

| 4,172,191 | 10/1979 | Nachtkamp et al. | |
|---|---|---|---|
| 4,558,090 | 12/1985 | Drexler et al. | 524/591 |
| 4,822,685 | 4/1989 | Perez et al. | 427/407.1 |
| 4,859,743 | 8/1989 | Ambrose et al. | 427/407.1 |
| 4,914,148 | 4/1990 | Mille et al. | 524/591 |
| 4,945,128 | 7/1990 | Mille et al. | 524/591 |
| 5,075,372 | 12/1991 | Mille et al. | 524/839 |

FOREIGN PATENT DOCUMENTS

A-0355433  2/1990  European Pat. Off.

*Primary Examiner*—James J. Seidleck
*Assistant Examiner*—John M. Cooney, Jr.

[57] ABSTRACT

The invention relates to a process for the production of multi-layer finishes in which the base coating contains crosslinked polymer microparticles which are obtainable by (A) reacting a polyester-polyol or a mixture of polyester-polyols with a polyisocyanate or with a mixture of polyisocyanates and (B) when at least 25% of the NCO groups have reacted, dispersing the resulting reaction mixture in water.

5 Claims, No Drawings

PROCESS FOR THE PRODUCTION OF A MULTI-LAYER FINISH AND A WATER-BORNE COATING

The invention relates to a process for the production of a multi-layer finish on a substrate surface, in which (1) a pigmented aqueous base coating which contains crosslinked polymer microparticles obtainable from polyester-polyols and polyisocyanates, is applied to the substrate surface, (2) a polymer film is formed from the composition applied in stage (1), (3) a transparent topcoat is applied to the basecoat thus obtained and (4) the basecoat is then stoved together with the topcoat.

The invention also relates to a water-borne coating which contains crosslinked polymer microparticles obtainable from polyester-polyols and polyisocyanates and to the use of this coating for the production of filler and/or stone-chip intermediate primer layers in automotive finishes.

The process described above can be employed in particular in automotive finishing to produce multi-layer finishs of the basecoat-clearcoat type—in particular for the production of metallic effect finishes (compare, for example, German Offenlegungsschrift 3,606,512).

In the preparation of the crosslinked polymer microparticles by the process disclosed in German Offenlegungsschrift 3,606,512, dispersions having a relatively high coagulate content and an unsatisfactory storage stability are as a rule obtained. Another disadvantage of the polymer microparticles disclosed in German Offenlegungsschrift 3,606,512 is that aqueous metallic effect coatings which contain these polymer microparticles often display a relatively high evolution of hydrogen.

The object on which the present invention is based is to improve the process described in the precharacterizing clause of the main claim.

This object is achieved, surprisingly, by employing in the process described in the precharacterizing clause a basecoat which contains crosslinked polymer microparticles which are obtainable by (A) reacting a polyester-polyol or a mixture of polyester-polyols with a polyisocyanate or with a mixture of polyisocyanates and (B) when at least 25% of the NCO groups have reacted, dispersing the resulting reaction mixture in water.

In the first step of the process for the preparation of the polymer microparticles employed according to the invention, a polyester-polyol or a mixture of polyester-polyols with a polyisocyanate or with a mixture of polyisocyanates are reacted with one another so that at least 25%, preferably 30 to 60 and particularly preferably 35 to 45%, of the NCO groups contained in the reaction mixture are reacted. The prepolymers obtained in this manner are then dispersed in water, where they react completely to give crosslinked polymer microparticles.

In order to obtain crosslinked polymer microparticles, the OH functionality of at least part of the polyester-polyol component must be more than 2 and/or the NCO functionality of at least part of the polyisocycanate component must be more than 2. Polyester-polyols or polyester-polyol mixtures having an average OH functionality of 2.0 to 4.0, preferably 2.0 to 3.0, particularly preferably 2.2 to 2.6, and polyisocyanates or polyisocyanate mixtures having an average NCO functionality of 2.0 to 4.0, preferably 2.0 to 3.0, particularly preferably 2.9 to 3.1, are advantageously employed.

In order to obtain stable polymer microparticle dispersions, at least part of the polyester-polyol components and/or at least part of the polyisocyanate component must contain stabilizing ionic and/or nonionic groups. The stabilizing groups are preferably in the polyester-polyol component. Stabilizing groups which are employed are preferably ionic, particularly preferably anionic, groups, such as, for example, carboxylate, sulfonic acid and phosphate groups. Carboxylate groups are especially preferably employed as stabilizing groups. Poly(oxyalkylene) groups, such as, for example, poly(oxyethylene), poly(oxypropylene) and poly (oxyethyleneoxypropylene) groups, are mentioned as an example of nonionic stabilizing groups.

The content of stabilizing groups needed for formation of a stable dispersion can be determined with the aid of simple series experiments. In the case of preferred stabilization by means of carboxylate groups, 1 mol of the polyester-polyol component should contain at least 0.3 equivalent of carboxylate groups.

The neutralization, with the aid of bases or acids, of groups capable of acid formation which may be necessary is preferably carried out shortly before the dispersion or during the dispersion of the reaction mixture formed in stage (A) in the aqueous dispersing medium.

Possible groups which are capable of salt formation are, above all, carboxyl and sulfonic acid groups. These groups are preferably neutralized with a tertiary amine. Suitable tertiary amines for neutralization of the groups capable of anion formation are, for example, trimethylamine, triethylamine, dimethylaniline, diethylaniline, triphenylamine, N,N-dimethylethanolamine, morpholine and the like.

In contrast to the teaching of German Offenlegungsschrift 3,606,512, it is essential for the invention of the present invention that the polyester-polyol component and the polyisocyanate component are subjected to a preliminary reaction before the dispersion in water (cf. column 9, lines 33-38 of German Offenlegungsschrift 3,606,512).

This preliminary reaction between the polyester-polyol component and the polyisocyanate component can be carried out either in the absence of solvents or in solvents which are inert towards NCO groups. The preliminary reaction is preferably carried out at 20° to 80° C., particularly preferably at 20° to 35° C., in a water-dilutable solvent which is inert towards NCO groups (for example acetone or methyl ethyl ketone). The preliminary reaction is carried out at least until 25% of the NCO groups have reacted. The content of NCO groups in the reaction mixture can be monitored, for example titrimetrically using dibutylamine. The preliminary reaction is advantageously carried out until 30 to 60%, preferably 35 to 45%, of the NCO groups in the reaction mixture have reacted.

The preliminary reaction can of course be catalyzed with catalysts customary for the formation of urethanes, such as, for example, dibutyltin dilaurate, triethylamine and the like.

The reaction mixture obtained out of the preliminary reaction is dispersed in water. The water can also additionally contain organic solvents. Examples which may be mentioned of solvents which can be present in the water are heterocyclic, aliphatic or aromatic hydrocarbons, mono- or polyhydric alcohols, ethers, esters and ketones, such as, for example, N-methylpyrrolidone, toluene, xylene, butanol, ethyl- and butylglycol and acetates thereof, butyldiglycol, ethylene glycol dibutyl ether, ethylene glycol diethyl ether, diethylene glycol dimethyl ether, cyclohexanone, methyl ethyl ketone, acetone, isophorone or mixtures thereof.

After the reaction mixture obtained in stage (A) has been transferred into water, a stable aqueous dispersion is obtained. In the process according to the invention—in contrast to the teaching of German Offenlegungsschrift 3,606,512—it is not necessary for the dispersion obtained, after transfer of the reaction mixture obtained in stage (A) into water—to be heated for the formation of crosslinked polymer microparticles. The resulting advantages are: lower coagulate content, lower foaming, increased dispersion stability.

It is of course also possible for the dispersion obtained—after transfer of the reaction mixture obtained in stage (A) into water—to be heated to form crosslinked polymer microparticles, the abovementioned disadvantages being at least partly forfeited.

The diameter of the crosslinked polymer microparticles should preferably be less than one micrometer, particularly preferably between 0.05 and 0.2 μm. The size of the particles is determined inter alia by the viscosity of the reaction mixture formed in stage (A), by the content of stabilizing groups and by the stirring speed during dispersion. A reduction in viscosity, an increase in the content of stabilizing groups and an increase in the stirring speed lead to a reduction in particle size.

If the preliminary reaction is carried out in the presence of one or more organic solvents, it is in many cases advantageous for the solvent or solvents to be removed from the aqueous dispersion by distillation, if appropriate in vacuo.

Examples of suitable polyester-polyols are, in particular, the reaction products, which are known per se in polyurethane chemistry, of polyhydric polyols with polycarboxylic acids or polycarboxylic anhydrides.

Polyols which are suitable for the preparation of the polyester-polyols are, for example, ethylene glycol, propane-1,2- and 1,3-diol, butane-1,3- and 1,4-diol, the isomeric pentanediols, hexanediols or octanediols, such as, for example, 2-ethylhexane-1,3-diol, trimethylolpropane, glycerol, bishydroxymethylcyclohexane, erythritol, mesoerythritol, arabitol, adonitol, xylitol, mannitol, sorbitol, dulcitol, hexanetriol, (poly)pentaerythritol and the like.

The polycarboxylic acids which are suitable for the preparation of the polyester-polyols consist primarily of low molecular weight polycarboxylic acids or their anhydrides having 2–18 carbon atoms in the molecule.

Di- and tricarboxylic acids are preferably employed. Examples of suitable acids are oxalic acid, succinic acid, fumaric acid, phthalic acid, isophthalic acid, terephthalic acid, tetrahydrophthalic acid, hexahydrophthalic acid, adipic acid, azelaic acid, sebacic acid, maleic acid, glutaric acid, hexachlorophthalic dicarboxylic acid, tetrachlorophthalic acid and trimellitic acid. Instead of these acids, it is also possible for their anhydrides, where these exist, to be employed.

It is also possible to employ polyester-polyols which have been prepared by polymerization of lactones.

The polyester-polyols are preferably chosen so that they can be dispersed in water by themselves to give a stable dispersion. The relationships between the build-up of the polyester-polyols (acid number, molecular weight . . . ) and the dispersion properties thereof are well known to the average expert, and he can select the optimum polyester-polyol component for solving the particular problem with the aid of a few guiding preliminary experiments.

It is preferable to employ polyester-polyols which have a number-average molecular weight of 80 to 2000, preferably 500 to 1000, particularly preferably 700 to 800. It is also possible to employ mixtures of polyester-polyols and other compounds which contain groups which are reactive towards NCO groups (polyether-polyols, polyamines . . . ).

Polyisocyanates are understood as being compounds which contain a statistical average of more than one NCO group per molecule. Examples which may be mentioned are: trimethylene diisocyanate, tetramethylene diisocyanate, pentamethylene diisocyanate, hexamethylene diisocyanate, ethylethylene diisocyanate, dimethylethylene 2,3-diisocyanate, methyltrimethylene 1-diisocyanate, cyclopentylene 1,3-diisocyanate, cyclohexylene 1,4-diisocyanate, cyclohexylene 1,2-diisocyanate, phenylene 1,3-diisocyanate, phenylene 1,4-diisocyanate, toluylene 2,4-diisocyanate, toluylene 2,6-diisocyanate, biphenylene 4,41-diisocyanate, naphthylene 1,5-diisocyanate, naphthylene 1,4-diisocyanate, 1-isocyanato-methyl-5-isocyanato-1,3,3-trimethylcyclohexane, bis-(4-isocyanatocyclohexyl) methane, bis-(4-isocyanatophenyl)-methane, 4,4'-diisocyanatodiphenyl ether and 2,3-bis-(8-isocyanatooctyl)-4-octyl-5-hexyl-cyclohexane.

It is also possible for prepolymers containing isocyanate groups to be employed as polyisocyanate components. Examples of suitable prepolymers are reaction products of polyisocyanates, polyether- and/or polyester-polyols and if appropriate customary chain-lengthening agents.

Cycloaliphatic or aliphatic polyisocyanates, which can be dimerized or trimerized if appropriate, or mixtures of such polyisocyanates are preferably employed in the present invention. Cycloaliphatic or aliphatic triisocyanates, in particular trimerized aliphatic diisocyanates, are particularly preferably employed.

Aqueous dispersions of crosslinked polymer microparticles which have a low coagulate content and a satisfactory storage stability and can be incorporated in the customary manner into pigmented aqueous basecoats (compare, for example, German Offenlegungsschrift 3,545,618) to produce multi-layer finishes of the base-coat-clearcoat type, in particular metallic effect finishes, are obtained in the manner described above. These basecoats are distinguished by a high storage stability, high gassing stability and low viscosity at a high solids content and produce metallic effect coatings having a very good metallic effect.

The dispersions of crosslinked polymer microparticles in question can on principle be incorporated into any waterborne coating. It is in this way possible to increase the solids content of the water-borne coatings without a marked increase in viscosity occurring at the same time. If the dispersions of crosslinked polymer microparticles in question are incorporated into water-borne coatings for the production of filler and/or stone-chip intermediate primer layers in automotive finishs, dull films are advantageously obtained. Water-borne coatings for the production of filler and/or stone-chip intermediate primer coats have already been known for a long time and are described, for example in German Offenlegungsschrift 3,805,629.

The crosslinked polymer microparticles according to the invention are incorporated into the water-borne coatings in amounts such that the desired properties reach an optimum. The optimization work needed for this belongs to the routine work of the expert. Basecoats usually contain 10 to 70, preferably 30 to 40% by weight, and water-borne coatings for the production of filler and/or stone-chip intermediate primer layers usually contain 5 to 50, preferably 10 to 25% by weight of the crosslinked polymer microparticles according to the invention, the % by weight data being related to the total amount of binders and crosslinking agents contained in the coating.

The coatings containing the polymer microparticles according to the invention can be applied to all substrates, in particular metals, but also to wood, plastic and the like, by spraying, dipping, brushing or knife-coating, preferably by spraying. The basecoats containing the polymer microparticles according to the invention can in principle be overcoated with any clear coats, for example with clear coats containing solvents, water-borne clear coats or powder clear coats.

The invention is illustrated in more detail in the following examples. All the data on parts and percentages are by weight, unless expressly stated otherwise.

EXAMPLES

1. Preparation of polyester-polyols 1.1 Polyester 1

2870.1 parts by weight of hexane-1,6-diol and 1076.0 parts by weight of isophthalic acid are subjected to precondensation at 230° C. up to an acid number of 5. The product is then reacted with 1485.3 parts by weight of trimellitic anhydride at 160° C. up to an acid number of 57. A polyester having an OH equivalent weight of 286 results. The polyester is partly dissolved to the extent of 68% in methyl ethyl ketone.

1.2 Polyester 2:

2870.1 parts by weight of hexane-1,6-diol and 1076.0 parts by weight of adipic acid are subjected to precondensation at 230° C. up to an acid number of 5. The product is then reacted with 1485.3 parts by weight of trimellitic anhydride at 160° C. up to an acid number of 66. A polyester having an OH equivalent weight of 302 results. The polyester is partly dissolved to the extent of 75% in methyl ethyl ketone.

2. Preparation of polymer microparticles according to the invention 2.1 Dispersion 1

407.0 parts by weight of polyester 1 and 233.5 parts by weight of trimerized hexamethylene diisocyanate (Desmodur N 3390®) are mixed at room temperature, while stirring, and 168 parts by weight of methyl ethyl ketone are added. After the mixture has been stirred at 30° C.–35° C. for 1 hour, a viscosity of between 0.3 and 0.4 Pas and an NCO conversion of 35–40% is reached. 500.0 parts by weight of deionized water are added to the reaction mixture in the course of 5 minutes. After water has been fed in for 2 minutes, 20.0 parts by weight of N,N-dimethylethanolamine (DMEA) are metered in over a period of 3 minutes. After the mixture has been stirred for 2 minutes, 1300 parts by weight of deionized water are added dropwise in the course of 30 minutes. During this procedure, the dispersing temperature is kept at 30° C. After the mixture has been stirred at 30° C. for 4 to 5 hours, no further NCO can be detected by titrimetry (determination according to DIN 53185).

The dispersion is filtered over a 31 μm sieve.

A milky dispersion which is insoluble in tetrahydrofuran results.

Characteristic data:

Solids content (1 hour, 130° C.): 22% by weight pH: 7.8–8.05

Particle size: 70 nm (autosizer)

Coagulate content: 0.001% by weight, based on the total amount weighed out

Viscosity: 0.0029 Pas 2.2 Dispersion 2

407.0 parts by weight of polyester 2 and 233.7 parts by weight of trimerized hexamethylene diisocyanate (Desmodur N 3390®) are mixed at room temperature, while stirring. After the mixture has been stirred at 30° C.–35° C. for 0.5 hour, a viscosity of between 0.3 and 0.4 Pas and an NCO conversion of 35–40% is reached. 500.0 parts by weight of deionized water are added to the reaction mixture in the course of 5 minutes. After water has been fed in for 2 minutes, 20.0 parts by weight of N,N-dimethylethanolamine (DMEA) are metered in over a period of 3 minutes. The mixture is then stirred for 2 minutes and 500.0 parts by weight of deionized water are subsequently added dropwise in the course of 30 minutes. During this procedure, the dispersing temperature is kept at 30° C. After the mixture has been stirred at 30° C. for 4 to 5 hours, no further NCO can be detected by titrimetry (in accordance with DIN 53185).

After filtration over a 31 μm sieve, a milky dispersion which is insoluble in tetrahydrofuran results.

Characteristic data

Solids content (1 hour 130° C.): 35% by weight pH: 7.95

Coagulate: 0.01% by weight, based on the total amount weighed out

Particle size: 68 nm (autosizer)

Viscosity: 0.058 Pas

3. Use of the polymer microparticles according to the invention in an aqueous basecoat 27 parts by weight of dispersion 1 according to the invention are added to 25 parts by weight of a thickener (paste of a sodium magnesium silicate having a layered structure, 3% strength in water), while stirring. 5 parts by weight of a polyester resin (1), 0.5 part by weight of dimethylethanolamine (10% strength in water), 2 parts by weight of a melamine resin (2), 5 parts by weight of a commercially available aluminum pigment paste, 5 parts by weight of butyl glycol and 27.5 parts by weight of water are added, while stirring further. After the mixture has been stirred for 30 minutes, a flow-out time of 25 seconds (measured in a DIN 4 cup at 23° C.) is established with water.

In a comparison example, the 25 parts by weight of dispersion 1 according to the invention are replaced by 22.5 parts by weight of a non-crosslinked polyurethane dispersion (3).

The resulting basecoat is sprayed onto a phosphated steel sheet. After a flash-off time of 15 minutes at room temperature, a commercially available 2-component clear coat based on polyacrylate/polyisocyanate is applied and the 2-layer covering thus obtained is stoved in a circulating air oven at 140° C. for 30 minutes.

(1) Water-soluble polyester from 832 parts by weight of neopentylglycol, 664 parts by weight of isophthalic acid and 384 parts by weight of trimellitic anhydride, prepared as described in Example 1.1, is diluted with 425 g of butanol.

Acid number of the polyester: 39

(2) A commercially available, low molecular weight melamine-formaldehyde resin which is highly esterified with methanol and has a solids content of 70% in water is employed.

(3) Polyurethane resin based on a condensation product of a polymeric fatty acid with isophthalic acid, hexane-1,6-diol, dimethylolpropionic acid and neopentylglycol, reacted with isophorone diisocyanate in methyl ethyl ketone, chain-lengthened with trimethylolpropane, neutralized with dimethylethanolamine and dispersed to the extent of 27% strength by weight in water.

Results:

|  | Effect 1) | DOI |
|---|---|---|
| Coating 1 Dispersion 1 | 145 | 93 |
| Coating 2 Comparison example | 125 | 90 |

$R_A$ is measured at an illumination under 45° and observation under -38° with aperture angles of 0.25°.

$R_S$ is measured at an illumination under 70° with an aperture of 1° and perpendicular observation with an aperture of 2°.

4. Use of dispersion 2 in an water-borne coating for the production of filler layers in automotive finishes.

An water-borne coating is prepared from the following components:

| 1. Wetting agent, commercially available | 0.2 part by weight |
|---|---|
| 2. Dimethylethanolamine (DMEA) | 0.1 part by weight |
| 3. Butyldiglycol | 2.5 parts by weight |
| 4. Antisettling agent (for example Additol XW 395 ®) | 3.4 parts by weight |
| 5. Flame soot | 0.15 part by weight |
| 6. Talc | 1.38 parts by weight |
| 7. Titanium dioxide | 11.75 parts by weight |
| 8. Barite | 11.75 parts by weight |
| 9. Melamine resin (Cymel 303 ®) | 2.55 parts by weight |

|  | V1 | V2 | V3 |
|---|---|---|---|
| 10. PUR dispersion (1) parts by weight | 42.1 | 24.5 | 55.7 |
| 11. Dispersion 2 parts by weight | 6.2 | 21.6 | 0 |
| 12. Polyester (2) parts by weight | 10.7 | 10.7 | 12.1 |

Components 1-8 are mixed with the polyester and ⅓ of the amount of dispersion 2 and the mixture is ground in a sand mill. Polyurethane dispersion 10, the remainder of dispersion 2 and the melamine resin are added to the ground material and the mixture is treated in a dissolver for about 30 minutes. The coating thus obtained is brought to a pH of 7.7 with dimethylethanolamine and to a viscosity of 25 seconds DIN 4 with water.

The coating is sprayed onto a phosphated steel sheet coated with a commercially available electrodeposition coating and stoved in a circulating air oven at 160° C. for 20 minutes.

(1) Polyurethane resin based on a condensation product of adipic acid with hexane-1,6-diol and neopentylglycol, reacted with 4,4-diisocyanotodicyclohexylmethane in methyl ethyl ketone, chain-lengthened with trimethylolpropane, neutralized with dimethylethanolamine and dispersed to the extent of 35% strength by weight in water.

(2) Neopentylglycol, tetrahydrophthalic anhydride and isophthalic acid (molar ratio 1.33:0.33:0.44) were subjected to precondensation by the process as described for polyester 1 at 200° C. up to an acid number of 18 and the product was reacted with 0.33 mol of trimellitic anhydride at 180° C. up to an acid number of 58. The polyester was partly dissolved to the extent of 85% in butylglycol and neutralized to the extent of 80% with dimethylethanolamine. The product was then brought to a solids content of 60% with deionized water.

Results:

| Batch | V1 | V2 | V3 |
|---|---|---|---|
| 60° Gloss | 34 | 24 | 76 |
| Solids content (25" DIN 4) | 49 | 52 | 45 |

5. Comparison examples (the procedure is in accordance with the teaching of German Offenlegungsschrift 3,606,512).

5.1 Comparison dispersion 1

233.5 parts by weight of trimerized hexamethylene diisocyanate (Desmodur N 3390®) and 168 parts by weight of methyl ethyl ketone are added to 407.0 parts by weight of polyester 1 and, after neutralization with 20 parts by weight of dimethylethanolamine, the mixture is dispersed in 1800 parts by weight of deionized water. The dispersion thus obtained is then kept at 90° C. for about 3 hours. During this procedure, the methyl ethyl ketone is distilled off. Severe foaming is observed during the reaction. The resulting dispersion is not stable.

5.2 Comparison dispersion 2

407 parts by weight of polyester 1 are reacted with 233.5 parts by weight of Desmodur N 3390® in accordance with Example 5.1. During this procedure, the reaction temperature is kept at 40° C. Severe foaming is observed.

Solids content (1 hour 130° C.): 20.3% by weight

Coagulate content: 3.9% by weight, based on the total amount weighed out.

What is claimed is:

1. A process for the production of a multi-layer finish on a substrate surface, comprising the steps of:
   (A) reacting a polyester-polyol or a mixture of polyester-polyols with a polyisocyanate or with a mixture of polyisocyanates, wherein at least one of the polyester-polyol component or the polyisocyanate component has an average functionality of more than two,
   (B) when 30 to 60% of the isocyanate groups have reacted, dispersing the reaction mixture in water and then completing the reaction to produce crosslinked polymer microparticles, wherein the dispersed microparticles are stabilized by ionic or poly(oxyalkylene) groups,
   (C) incorporating the resultant crosslinked polymer microparticles into a pigmented, aqueous basecoat,
   (D) applying the basecoat to a substrate surface,
   (E) forming a polymer film from the composition applied in step D,
   (F) applying a transparent topcoat to the basecoat thus obtained, and
   (G) stoving the basecoat together with the topcoat.

2. The process as claimed in claim 1 in which a polyester-polyol which contains carboxyl groups and has a number-average molecular weight of 500 to 1500 is employed as the polyester-polyol.

3. The process as claimed in claim 1 in which a cycloaliphatic and/or aliphatic polyisocyanate is employed.

4. The process as claimed in claim 1 in which stage (A) is carried out in a water-dilutable organic solvent which is inert towards NCO groups.

5. The process as claimed in claim 1, in which the reaction mixture obtained in stage (A) is dispersed in an amount of water such that the resulting dispersion has a solids content of 20 to 50% by weight.

* * * * *